United States Patent
Yamashita et al.

(10) Patent No.: US 6,411,457 B2
(45) Date of Patent: Jun. 25, 2002

(54) RECORDING/REPRODUCING METHOD AND RECORDING/REPRODUCING APPARATUS

(75) Inventors: Keitaro Yamashita, Kanagawa; Kanzo Okada, Chiba; Shunji Okada, Kanagawa; Masayuki Nakayama, Tokyo; Minoru Watanabe, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/755,373

(22) Filed: Jan. 5, 2001

Related U.S. Application Data

(62) Division of application No. 08/980,418, filed on Nov. 28, 1997, now Pat. No. 6,215,609.

(30) Foreign Application Priority Data

Nov. 29, 1996 (JP) .............................................. 8-333099

(51) Int. Cl.[7] .......................... G11B 19/02; G11B 19/20; G06F 1/32
(52) U.S. Cl. ..................................... 360/73.03; 713/320
(58) Field of Search ........................ 360/69, 71, 73.01, 360/73.03, 73.05, 73.06, 73.07; 369/53, 58; 713/300, 320, 322, 323, 324; 318/779

(56) References Cited

U.S. PATENT DOCUMENTS

| | | | |
|---|---|---|---|
| 4,351,044 A | 9/1982 | Imanaka et al. | 360/73.03 |
| 4,514,771 A | 4/1985 | Stark et al. | 360/73.03 |
| 4,530,018 A | 7/1985 | Hoshino et al. | 360/73.03 |
| 4,736,263 A | 4/1988 | Takahashi et al. | 360/73.03 |
| 5,016,124 A | 5/1991 | Fukushima et al. | 360/69 |
| 5,265,081 A | 11/1993 | Shimizume et al. | 369/48 |
| 5,412,809 A | 5/1995 | Tam et al. | 360/73.03 |
| 5,422,762 A | 6/1995 | Jerbic | 360/48 |
| 5,434,722 A | 7/1995 | Bizjak et al. | 360/69 |
| 5,493,670 A | 2/1996 | Douglis et al. | 360/73.03 |
| 5,682,273 A | 10/1997 | Hetzler | 360/75 |
| 5,699,335 A | 12/1997 | Joo et al. | 369/50 |
| 5,774,292 A | 6/1998 | Georgiou et al. | 360/73.03 |
| 5,787,292 A | 7/1998 | Ottesen et al. | 713/300 |
| 5,953,176 A | 9/1999 | Shimazu et al. | 360/73.03 |
| 5,982,570 A | 11/1999 | Koizumi et al. | 360/69 |
| 6,215,609 B1 * | 4/2001 | Yamashita et al. | 360/73.03 |

FOREIGN PATENT DOCUMENTS

| | | | | |
|---|---|---|---|---|
| JP | 62-129908 | 6/1987 | | 360/73.03 |
| JP | 1-82364 | 3/1989 | | 360/73.03 |

* cited by examiner

Primary Examiner—David L. Ometz
(74) Attorney, Agent, or Firm—Frommer Lawrence & Haug LLP; William S. Frommer; Darren M. Simon

(57) ABSTRACT

In a recording/reproduction apparatus, when a rotational-speed-mode setting instruction is received from an I/F unit, a CPU reads out a control procedure from a storage device, controlling other components in accordance with the procedure. As a result, a node switch driving circuit controls field windings of a pulse motor to a switching sequence, driving the pulse motor to rotation at a predetermined rotational speed. Since the control is feedback control, the pulse motor rotates at the predetermined rotational speed specified by an instruction setting a rotational-speed mode with a high degree of reliability. Data can thus be recorded into and reproduced from a magnetic disk at a variable speed.

26 Claims, 11 Drawing Sheets

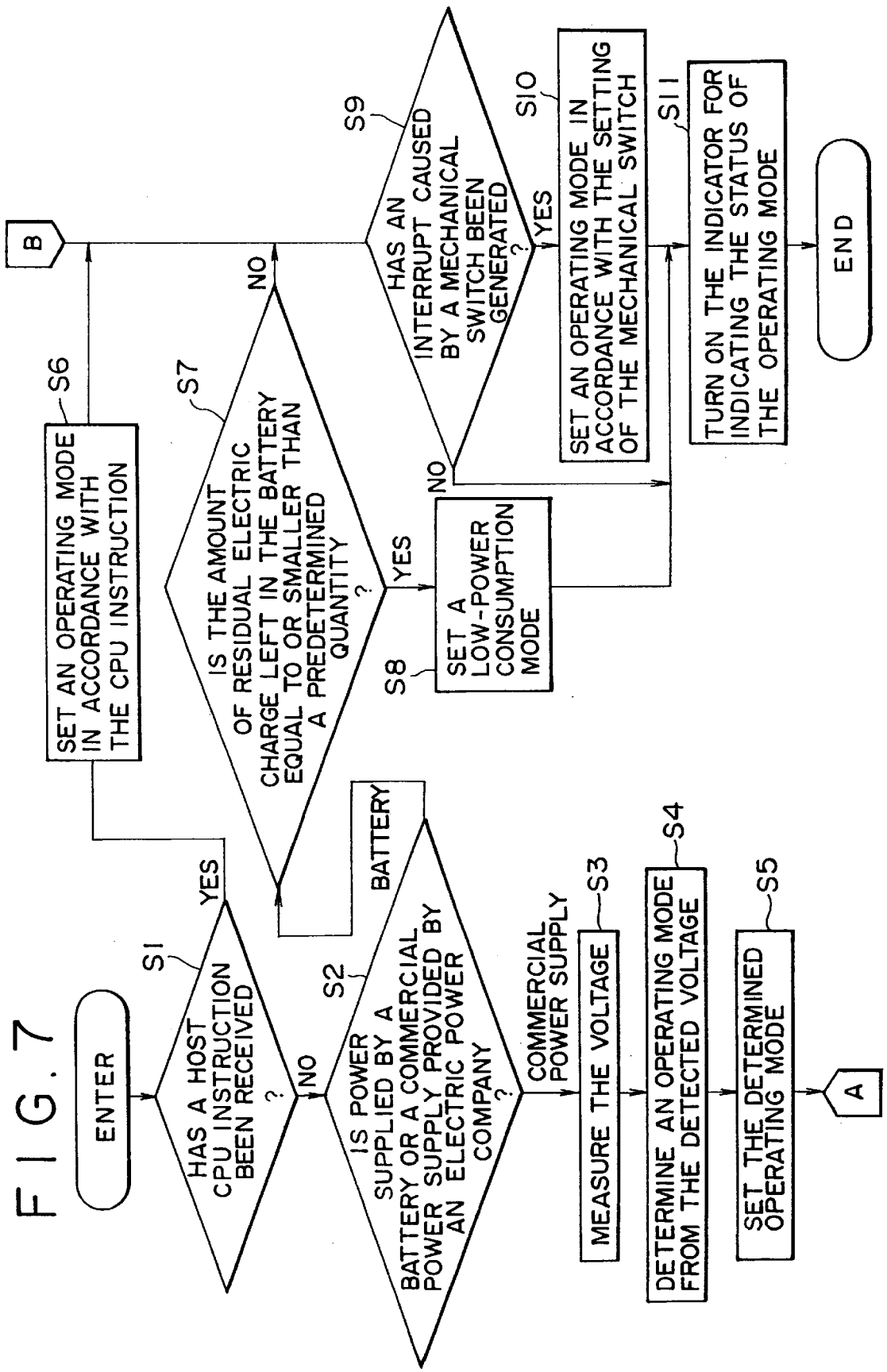

FIG. 8

DISK DIAMETER (inch) 2.5
CAPACITY 2.0 GB/PIECE
VIDEO-RECORDING TIME 68 MINUTES (TYPICAL)
(MPEG2/4Mbps)

| ROTATIONAL SPEED | TOC/FAT | NORMAL R/W (BATTERY MODE) | | | | UPLOAD/DOWNLOAD (HIGH-SPEED MODE) | |
|---|---|---|---|---|---|---|---|
| | 900 OUTERMOST CIRCUMFERENCE | 1800 INNERMOST CIRCUMFERENCE | 1800 OUTERMOST CIRCUMFERENCE | | | 12000 INNERMOST CIRCUMFERENCE | 12000 OUTERMOST CIRCUMFERENCE |
| ROTATIONAL SPEED (rps) | 15 | 30 | 30 | | | 200 | 200 |
| ROTATIONAL PERIOD (msec) | 66.7 | 33.3 | 33.3 | | | 5.0 | 5.0 |
| RADIUS (mm) | 30 | 15 | 30 | | | 15 | 30 |
| LINEAR SPEED (m/s) | 2.8 | 2.8 | 5.7 | | | 18.8 | 37.7 |
| TRANSFER RATE (Mbps: 4Gbit/sq, in) | 26.2 | 26.2 | 52.3 | | | 174.4 | 348.8 |
| LINE RECORDING DENSITY 235 Kbpi | | | | | | | |
| (Mbps) | 25.0 | 24.0 | 48.0 | | | 109.0 AVERAGE | 218.0 163.5 |
| (MB/s) | 3.1 | 3.0 | 6.0 | | | 13.6 AVERAGE | 27.2 20.4 |
| *TRACK JUMP = 3 msec | | | | | | | |
| RATIO TO MPEG2 (4Mbps) | 6.3 | 6.0 DOUBLE SPEED (AVERAGE) | 12.0 9.0 | | | 27.2 DOUBLE SPEED (AVERAGE) | 54.5 40.9 |
| TIME TO TRANSFER DATA OF ONE DISK | | 7 MINUTES AND 33 SECONDS | | | | 1 MINUTE AND 40 SECONDS | |

TIMING CHARTS

RECORDING/REPRODUCING METHOD AND RECORDING/REPRODUCING APPARATUS

This application is a divisional of U.S. application Ser. No. 08/980,418, filed Nov. 28, 1997, now U.S. Pat. No. 6,215,609.

BACKGROUND OF THE INVENTION

1. Field of the Invention

The present invention relates to a disk-type magnetic recording/reproducing apparatus which can be well used as a storage apparatus of a computer or as a storage apparatus for storing audio and video information.

2. Description of the Related Art

A motor employed in a tape-type magnetic recording/reproducing apparatus as a rotation driving means is designed into a mechanism wherein the characteristic of the motor can be switched from a low speed to a high speed in dependence on some types of rotation mode. In the case of a portable tape recorder, for example, one motor is used to drive a tape to travel at a low speed in a reproduction (playback) or recording operation and at a high speed in a fast-feeder rewind operation in neither a recording mode nor a reproduction mode. In order to implement the function to drive a tape at different speeds as described above, there is adopted a method whereby the characteristic of the motor is switched from a constant-speed (low-speed) state to a high-speed state and vice versa so as to allow the driven tape to travel well as is generally known.

In general, a disk-type magnetic recording/reproducing apparatus such as an apparatus for driving a floppy or hard disk used as an external storage device of a personal computer adopts a CAV (Constant Angular Velocity) system wherein the rotational angular velocity of a spindle motor serving as a rotation driving means is fixed.

In the case of a floppy disk, some floppy-disk drives adopt a CLV (Constant Linear Velocity) system wherein the rotational speed is varied from track to track to result in a fixed scanning velocity independently of the radial position of the head. The CAV and CLV systems are different from each other in that, in the case of the former, the scanning speed of the head is fixed while, in the case of the latter, the scanning speed of the head is variable. In the case of both the systems, however, only a single performance can be displayed as an operating mode allowing recording/reproduction operations.

It should be noted that, in the case of the CLV system, the ratio of a maximum rotational speed to a minimum rotational speed of a disk is equal the ratio of the radius of an outermost circumference of a data area on the disk for recording data to be reproduced later to the radius of an innermost circumference of the data area. That is, if the ratio of the outer-circumference radius to the inner-circumference radius of the data area is 2, the ratio of a maximum rotational speed to a minimum rotational speed of a disk is also 2. However, changes to rotational speed are controlled by a means for making the scanning speed of the head relative to the disk medium fixed and there is displayed only one recording/reproduction performance in a constant-speed recording/reproduction operating mode. That is, even if the rotational speed is changed, the recording/reproduction operating mode does not produce different kinds of recording/reproduction performance.

As such, in the prior art, there is no disk-type magnetic recording/reproduction apparatus which has a recording/reproduction operating mode providing different kinds of recording/reproduction performance at more than one rotational speed.

First of all, consider a hard-disk drive, a representative disk-type magnetic recording/reproduction apparatus. There are two kinds of hard-disk drive with a constant rotational speed: a hard-disk drive with a low rotational speed referred to hereafter as a low-speed disk drive and a hard-disk drive with a high rotational speed referred to hereafter as a high-speed disk drive. Differences between the low-speed disk drive and the high-speed disk drive are explained as follows.

The low-speed disk drive has an excellent power-consumption characteristic and an excellent rise time from a sleep mode in an operation to read a TOC (Table of Contents) or a FAT (File Allocation Table) used as an area for controlling data recording in files. That is, the rise time that results with the power consumed by the motor kept constant can be shortened and a motor cost for making the rise-time speed fixed as well as the amount of consumed power can be reduced.

On the other hand, the high-speed disk drive has an excellent capability of transferring data at a high transfer speed due to the fact that the disk is rotated at a high rotational speed.

Thus, a low-speed disk drive is not so good as a high-speed disk drive in that data can not be transferred at a high speed. However, the low-speed disk drive is convenient in that it can be employed in a portable apparatus due to the fact that the low-disk drive can be implemented with low power consumption. In addition, since it is difficult to implement a high-speed disk drive at low power consumption, the high-speed disk drive is not appropriate for a portable application wherein a long life of the battery thereof is desired. Nevertheless, the high-speed disk drive is capable of transferring data at a high speed.

SUMMARY OF THE INVENTION

It is thus an object of the present invention to provide a recording/reproduction method and a recording/reproduction apparatus that are capable of transferring data at a high speed and, at the same time, implementing low power consumption.

In order to achieve the object of the present invention described above, the present invention provides a recording/reproduction method for recording and reproducing information into and from a magnetic disk driven to rotation whereby, as recording/reproduction operating modes of the magnetic disk, the method is provided with a plurality of drive modes for different kinds of performance including at least a low-speed drive mode and a high-speed drive mode.

In addition, in order to achieve the object of the present invention described above, the present invention also provides a recording/reproduction apparatus for recording and reproducing information into and from a magnetic disk driven to rotation. The recording/reproduction apparatus is provided with at least a rotation driving unit for driving the magnetic disk to rotation and a control unit for controlling the rotation driving unit wherein the control unit is capable of controlling the rotation driving unit in a plurality of operating modes for different kinds of performance including at least a low-speed drive mode and a high-speed drive mode so as to drive the magnetic disk to rotation.

In the recording/reproduction method and the recording/reproduction apparatus provided by the present invention, when an operation in a high-speed mode is completed, first of all, the speed is reduced to a value in a low-speed mode before writing information into the TOC/FAT and then the speed is further reduced to halt the rotation of the magnetic disk.

As an alternative, when an operation in a high-speed mode is completed, information is written into the TOC/FAT with the speed sustained at a value in the high-speed mode and then the speed is reduced to halt the rotation of the magnetic disk.

As another alternative, when an operation in a high-speed mode is completed, information is written into the TOC/FAT with the speed sustained at a value in the high-speed mode and then the rotation of the magnetic disk is halted from the rotation in the high-speed mode.

In addition, in a start/halt system wherein a head is loaded and unloaded to and from the magnetic disk in a non-contact way, the rotational speed at which the magnetic disk is rotating at the time an operation is being started or halted is set at a value in the low-speed mode or a value in a low-power-consumption mode. As an alternative, the rotational speed at which the magnetic disk is rotating at the time an operation is being started or halted can be set at a value lower than that of the low-speed mode.

As another alternative, the rotational speed at which the magnetic disk is rotating at the time an operation is being started can be made different from the rotational speed at which the magnetic disk is rotating at the time an operation is being halted.

In addition, power supplied by a battery can be distinguished from power supplied by a commercial power supply provided by an electric-power company and, in an operation driven by power supplied from the battery, the recording/reproduction apparatus is set in an operating mode with low power consumption.

As described above, the recording/reproduction apparatus provided by the present invention has a plurality of recording/reproduction modes for different kinds of performance including at least a low-speed drive mode and a high-speed drive mode. As a result, when a transfer of data at a high speed is required, the recording/reproduction apparatus is switched to a high-speed drive mode for implementing the high-speed data transfer and, when power saving is needed, the recording/reproduction apparatus is switched to a low-speed drive mode for implementing the power saving.

In addition, power saving and operations to read out information from the FAT/TOC at a high speed can be implemented in the same apparatus.

BRIEF DESCRIPTION OF THE DRAWINGS

Embodiments of the present invention are described by referring to the following drawings wherein:

FIG. 7 is a diagram showing an example of a theoretical flow of the method to switch the R/W operating mode in a recording/reproduction apparatus provided by the present invention;

FIG. 8 is a diagram showing a table comparing performances of the recording/reproduction apparatus provided by the present invention;

DETAILED DESCRIPTION OF THE PREFERRED EMBODIMENTS

Figure 1:
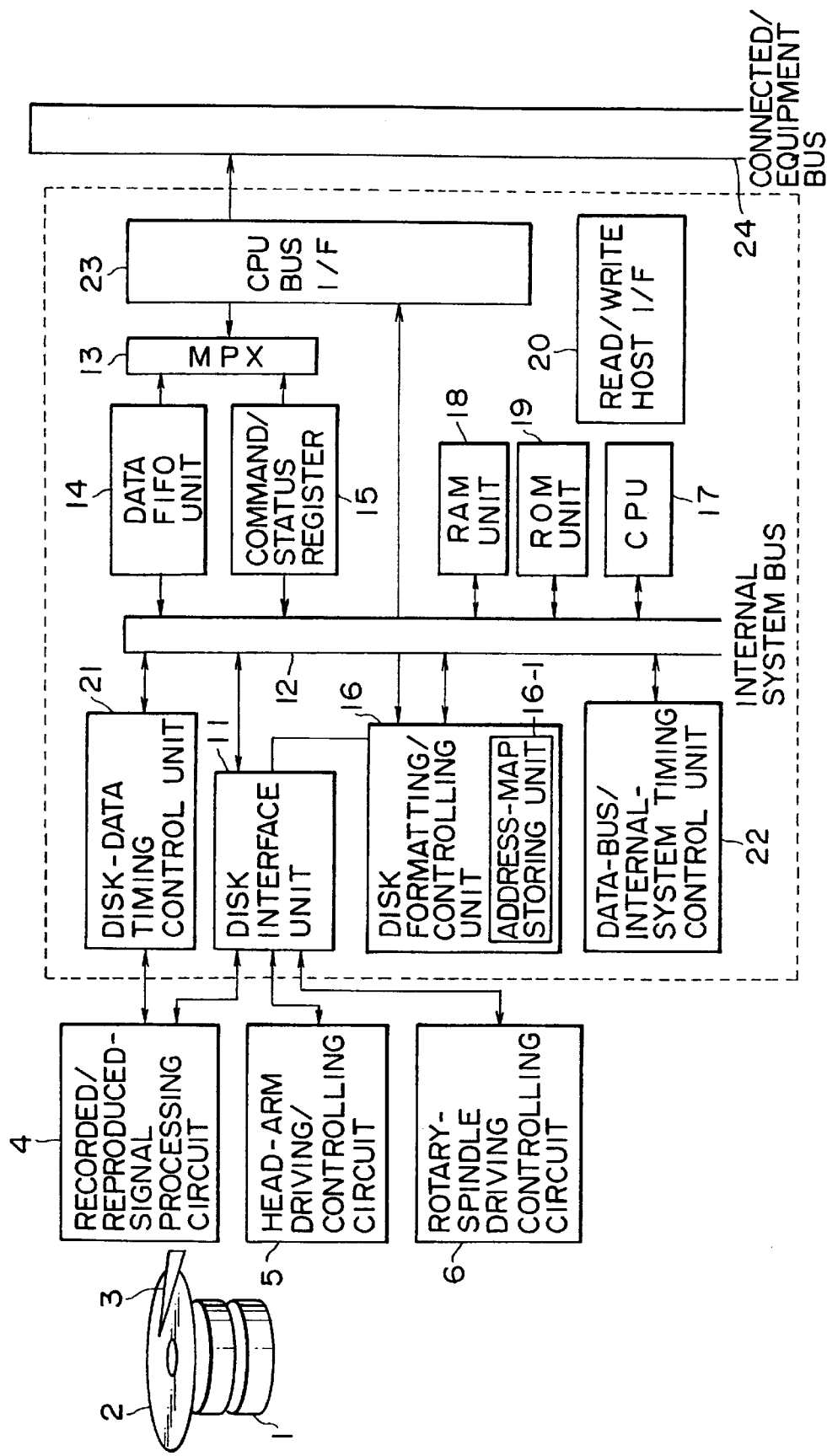
FIG. 1 is a block diagram showing a typical configuration of an embodiment implementing a recording/reproduction apparatus provided by the present invention wherein a recording/reproduction method provided by the present invention is implemented.

The present invention will become more apparent from a careful study of the following detailed description of some preferred embodiments with reference to accompanying diagrams showing the embodiments. FIG. 1 is a block diagram showing a typical configuration of an embodiment implementing a recording/reproduction apparatus provided by the present invention wherein a recording/reproduction method provided by the present invention is implemented. It should be noted that FIG. 1 shows the overall configuration of a recording/reproduction apparatus which is capable of recording and reproducing data in a plurality of operating modes at different rotational speeds of the magnetic disk.

In the figure, reference numeral 1 denotes a rotation driving unit comprising a spindle motor and a sensor for sensing the rotational speed of the spindle motor. Reference numeral 2 is a magnetic disk driven to rotation by the rotation driving unit 1 and reference numeral 3 is a head unit for writing a signal to be recorded into the magnetic disk 2 and reading out a signal recorded on the magnetic disk 2. Reference numeral 4 is a recorded/reproduced-signal processing circuit for processing a signal to be written into the magnetic disk 2 in a recording operation and a signal read out from the magnetic disk 2 in a reproduction operation. Reference numeral 5 denotes a head-arm driving/controlling circuit for moving a head arm of the head unit 3 to a predetermined track position. Reference numeral 6 is a rotary-spindle driving/controlling circuit for driving and controlling the spindle motor employed in the rotation driving unit 1. Reference numeral 7 denotes a controller including a data formatter, a data buffer and an internal controller and a hard-disk controller having an embedded host adapter.

Next, blocks composing the hard-disk controller 7 are explained. Reference numerals 11 and 12 are a disk interface unit and an internal system bus respectively. Reference numeral 13 denotes a multiplex circuit (MPX) for separating a register instruction from data received from an external source through a CPU bus interface (CPU bus I/F) 23. Reference numeral 14 is a data FIFO unit for passing a predetermined number of bytes of data before and after multiplexing carried out in the multiplex circuit 13. Reference numeral 15 is a command/status register for storing a command and status information received from the multiplex circuit 13.

Reference numeral 16 denotes a disk formatting/controlling unit for controlling an address map of data recorded on the magnetic disk 2 and carrying out formatting of the magnetic disk 2 as part of signal processing. The disk formatting/controlling unit 16 is provided with an address-map storing unit 16-1 for storing the address map. Reference numeral 17 is a CPU for carrying out processing to record and reproduce data, processing to control a driving system and processing of communication with a host in accordance with a variety of disk parameters and commands as well as various kinds of status information. Reference numeral 19 denotes a ROM unit for storing a control procedure prescribing various kinds of control and a control procedure prescribing read operations to be carried out by the CPU 17. Reference numeral 18 is a RAM unit used as a data-processing work area of the CPU 17.

Reference numeral 20 denotes a read/write host interface through which data is read out and written by the host. Reference numeral 21 is a disk-data timing control unit for supplying a clock signal according to the rotational speed of the magnetic disk 2 to specified circuits during signal processing to read out or write data from or to the magnetic disk 2 which can be rotated at a plurality of rotational speeds. Reference numerals 22 denotes a data-bus/internal-system timing control unit for supplying a processing clock signal to all components in the disk controller 7 other than the specified circuits cited above It should be noted that the disk-data timing control unit 21 can be designed so as to generate the clock signal by dividing the frequency of the processing clock signal received from the data-bus/internal-system timing control unit 22.

Next, the operation of the recording/reproduction apparatus provided by the present invention with a configuration described above is explained. When data and a recording or reproduction instruction thereof are received by way of a connected-equipment bus 24 and the CPU bus I/F 23, the instruction is separated from the data by the MPX 13 and stored in the command/status register 15. The CPU 17 interprets this instruction, controlling the disk-data timing control unit 21 and the data-bus/internal-system timing control unit 22 by executing the control procedures (that is, a program) stored in the ROM unit 19. As a result, the disk-data timing control unit 21 supplies the clock signal with a frequency proportional to a set rotational speed of the magnetic disk 2 to the specified circuits including the recorded/reproduced-signal processing circuit 4 so that signal processing to read out or write data from or to the magnetic disk 2 being rotated at the rotational speed can be carried out. On the other hand, the data-bus/internal-system timing control unit 22 supplies a predetermined processing clock signal to all components in the disk controller 7 other than the specified circuits.

In addition, the disk formatting/controlling unit 16 controls components such as the head-arm driving/controlling circuit 5 through the disk interface unit 11 in accordance with an address map stored in the address-map storing unit 16-1 so that the head is moved to a predetermined position for recording or reproducing data. Furthermore, a control signal is supplied to the rotary-spindle driving/controlling circuit 6 by way of the disk interface unit 11 so as to drive the rotation driving unit 1 to rotation at a set rotational speed.

As a result, the magnetic disk 2 is controlled by the rotation driving unit 1 to a rotation at the set rotational speed. As the rotation of the magnetic disk 2 achieves the rotational speed, the head unit 3 records or reproduces data onto or from the magnetic disk 2.

At that time, if the received instruction is a recording instruction, the incoming data to be recorded should have been stored in the data FIFO unit 14 through the connected-equipment bus 24. The data to be recorded is then transferred from the data FIFO unit 14 to the recording/reproduction-signal processing unit 4 before being recorded by the head unit 3 onto the magnetic disk 2.

If the received instruction is a reproduction instruction, on the other hand, data read out by the head unit 3 from the magnetic disk 2 undergoes signal processing in the recording/reproduction-signal processing unit 4, being converted into reproduced data which is then transmitted to the connected-equipment bus 24 by way of the data FIFO unit 14, the MPX 13 and the CPU bus I/F 23.

The following is description of how the rotational speed of the magnetic disk 2 is set.

When data is recorded into or reproduced from the magnetic disk 2, first of all, file control information stored in the FAT, a file recording control area, or from the TOC is read out from the magnetic disk 2. At that time, the recording/reproduction apparatus is put in a sleep mode, a state waiting for the magnetic disk 2 to reach a predetermined rotational speed from a halt state before reading out the file control information from the FAT or the TOC. In this way, if the file control information is read out in a mode with a low rotational speed, that is, in a low-speed drive mode, the operation to read out the file control information can be carried out within a short period of time because the time it takes for the magnetic disk 2 to reach the predetermined low rotational speed can be shortened.

In addition, when the recording/reproduction apparatus is driven by a battery, it is desirable to put the recording/reproduction apparatus in a low-speed drive mode which allows power saving to be implemented. In this case, the recording/reproduction apparatus can also be controlled so that the mode with a high rotational speed, that is, the high-speed drive mode, is inhibited only when the voltage output by the battery drops to a value lower than a predetermined level.

Furthermore, when handling a large amount of image data, it is desirable to put the recording/reproduction apparatus in a high-speed drive mode that allows data to be transferred in a short period of time.

It should be noted that a transition from a low-speed drive mode to a high-speed drive mode and vice versa can be carried out either automatically or manually by the user through an operation of a component such as a switch.

In addition, it is also possible to set the recording/reproduction apparatus at a stage between the low-speed and high-speed drive modes such as an intermediate-speed drive mode, a semi-low-speed drive mode or a semi-high-speed drive mode.

In order to allow the recording/reproduction apparatus to be set at a plurality of drive modes at different rotational speeds described above, however, it is necessary to provide a spindle motor having a variable rotational speed over a wide range, from a high speed to a low speed, as well as a head floating technology very hardly dependent on the speed of the magnetic head relative to the magnetic disk, that is, a magnetic head unit independent of the relative speed over a range of speeds of the magnetic head relative to the magnetic disk. In addition, it is also necessary to provide a magnetic recording technology covering a servo and/or signal processing circuit capable of keeping up with a wide range of rotational speeds and a disk drive control circuit.

For the reasons described above, the recording/reproduction apparatus provided by the present invention employs a slider which has a floating head with a fixed amount of floating of over a wide range of linear speeds and is very hardly dependent on the linear speed. An example of such a slider is the negative-pressure slider. In addition, as a magnetic head, a head generating a reproduction signal independent of the linear speed of the magnetic disk is employed. An example of such a head is the MR head The following is detailed description of components composing the rotary-spindle driving/controlling circuit 6 having a plurality of rotational-speed operating modes for recording and reproduction operations, a characterizing feature of the present invention.

Figure 2:
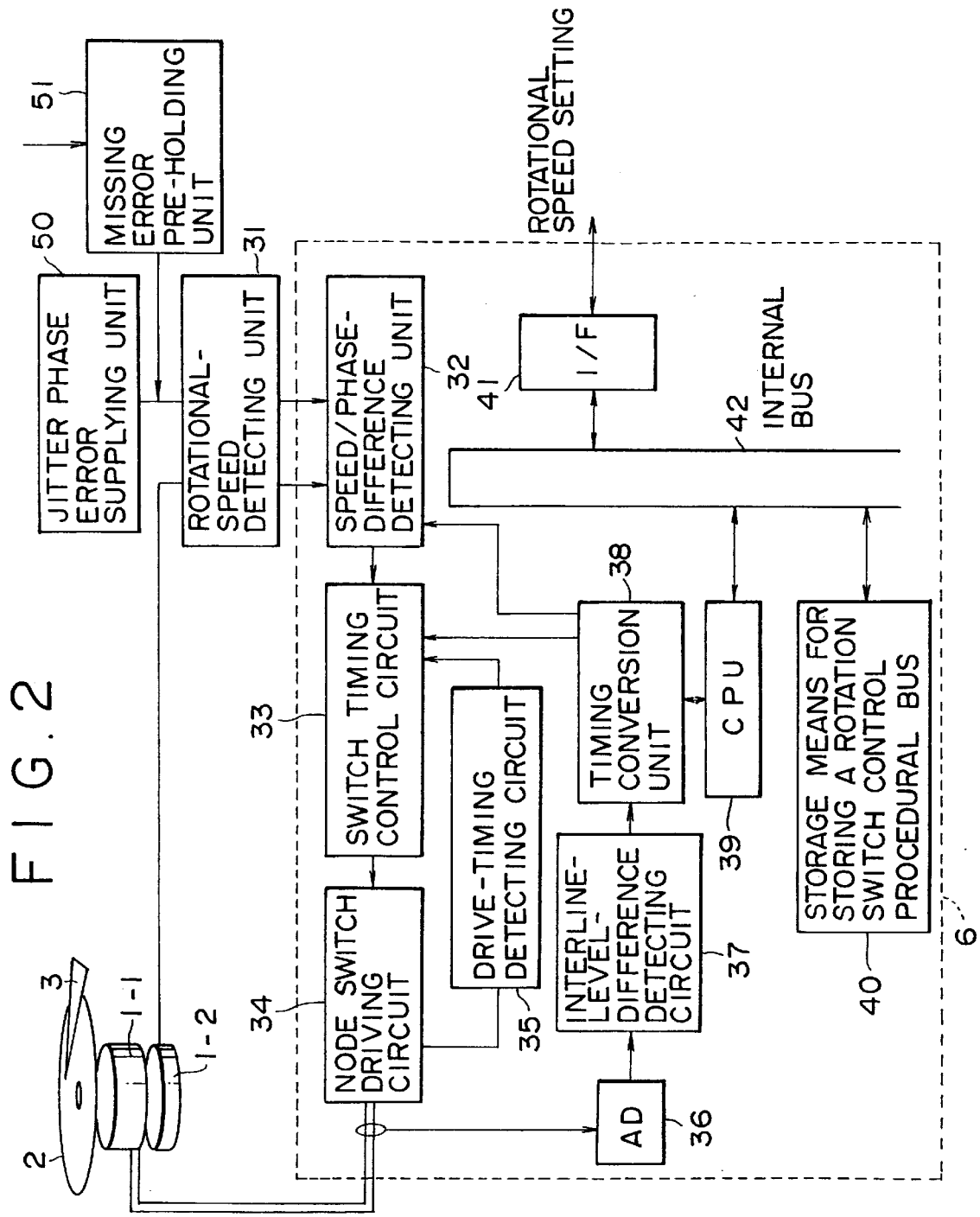
FIG. 2 is a block diagram showing details of the configuration of components composing the rotary-spindle driving/controlling circuit employed in the recording/playback apparatus provided by the present invention.

FIG. 2 is a block diagram showing the configuration of components composing the rotary-spindle driving/controlling circuit 6. In the figure, reference numeral 1-1 denotes a flat-type direct-current pulse motor serving as the spindle motor of the rotation driving unit 1 and reference numeral 1-2 is a phase detecting sensor for sensing the rotational speed of the direct-current pulse motor. Reference numeral 2 is a magnetic disk which data is recorded into and reproduced from whereas reference numeral 3 is a head unit for writing data to be recorded into the magnetic disk 2 and reading out data recorded in the magnetic disk 2.

Reference numeral 31 denotes a rotational-speed detecting unit. Receiving a signal output by the phase detecting sensor 1-2, the rotational-speed detecting unit 31 detects the rotational speed of the direct-current pulse motor 1-1. Reference numeral 32 is a speed/phase-difference detecting unit. Receiving the rotational speed signal from the rotational-speed detecting unit 31 and a rotation reference timing signal from a timing conversion unit 38, the speed/phase-difference detecting unit 32 detects the difference in speed/phase between the two signals. Reference numeral 33 denotes a switch timing control circuit for controlling switch on/off switching timing of a node switch driving circuit 34 for generating a drive signal which is used for driving the direct-current pulse motor 1-1. To put it in detail, the node switch driving circuit 34 supplies driving currents to terminal nodes of magnetic-pole windings of the direct-current pulse motor 1-1. Reference numeral 35 is a drive-timing detecting circuit for detecting on/off timing with which the node switch driving circuit 34 supplies driving currents to the terminal nodes, comparing the detected on/off timing with reference on/off timing. The drive-timing detecting circuit 35 then feeds a signal representing the difference between the detected on/off timing and the reference on/off timing back to the switch timing control circuit 33 so as to make the switch timing control circuit 33 control the node switch driving circuit 34 to operate with the reference on/off timing.

Reference numeral 36 denotes an AD converter for converting a voltage between drive lines of the node switch driving circuit 34 into a digital signal. Reference numeral 37 is an interline-level-difference detecting circuit. Receiving a digital signal representing a voltage between drive lines from the AD converter 36, the interline-level-difference detecting unit 37 detects the difference in voltage level between drive lines. Reference numeral 38 is a timing conversion unit for converting the difference in voltage level between drive lines received from the interline-level-difference detecting unit 37 into a timing time, feeding back the timing time to the switch timing control unit 33. Reference numeral 39 denotes a CPU. Receiving a rotational-speed-mode instruction, the CPU 39 controls timing, determines which current drive switch circuit is to be used and controls the setting of a mode such as the setting of a phase-difference state control response. Reference numeral 40 is a memory storage means for storing a rotation switch control procedural program, an operating program to be executed by the CPU 39, and a rotation switch map. The memory storage means 40 also includes a control work area. Reference numeral 41 is an interface (I/F) unit for receiving a rotational-speed-mode setting instruction for controlling the direct-current pulse motor 1-1 to rotate at a predetermined rotational speed from a source outside the rotary-spindle driving/controlling circuit 6. Reference numeral 42 denotes an internal bus.

Reference numeral 150 is a jitter phase error supplying unit for supplying information on a data phase jitter error from the rotating magnetic disk 2 to the rotational-speed detecting unit 31. Reference numeral 51 is a miss-error pre-holding unit for carrying out pre-hold processing of information on a data phase jitter error based on burst miss information.

The operation of the rotary-spindle driving/controlling circuit 6 with a configuration described above is explained as follows. When a rotational-speed-mode setting instruction is received through the I/F unit 41, the CPU 39 executes the rotation switch control procedural program stored in the memory storage means 40, supplying information on a rotational speed to the timing conversion unit 38 in accordance with the control procedure of the program. The timing conversion unit 38 converts the informational rotational speed into a timing time, supplying the timing time to the speed/phase-difference detecting unit 32 as a rotation reference timing signal. The speed/phase-difference detecting unit 32 detects a difference in speed/phase between the rotation reference timing signal and a signal representing the rotational speed of the direct-current pulse motor 1-1, supplying an error signal representing the difference to the switch timing control circuit 33.

Receiving the error signal and a rotation timing signal from the timing conversion unit 38, the switch timing control circuit 33 generates a switch on/off switching timing signal of the node switch driving circuit 34 for generating a drive signal which is used for driving the direct-current pulse motor 1-1

The node switch driving circuit 34 supplies driving currents to terminal nodes of magnetic windings of the direct-current pulse motor 1-1 in accordance with the switch on/off switching timing signal generated by the switch timing control circuit 33 so as to let the direct-current pulse motor 1-1 rotate at a predetermined rotational speed.

In the mean time, the drive-timing detecting circuit 35 detects the timing of the driving currents, feeding back a signal representing the difference between the detected timing and predetermined reference timing to the switch timing control circuit 33. In this way, the node switch driving circuit 34 is capable of supplying driving currents to terminal nodes of magnetic windings of the direct-current pulse motor 1-1 with the predetermined timing. In addition, the AD converter 36 converts a voltage between drive lines of the node switch driving circuit 34 into a digital signal. The interline-level-difference detecting circuit 37 receives a digital signal representing a voltage between drive lines from the AD converter 36, detecting the difference in voltage level between drive lines. The timing conversion unit 38 converts the difference in voltage level between drive lines received from the interline-level-difference detecting unit 37 into a timing time, feeding back the timing time to the switch timing control unit 33. As a result, the direct-current pulse motor 1-1 is controlled to rotate at a rotational speed set by the rotational-speed-mode setting instruction.

Figure 3:
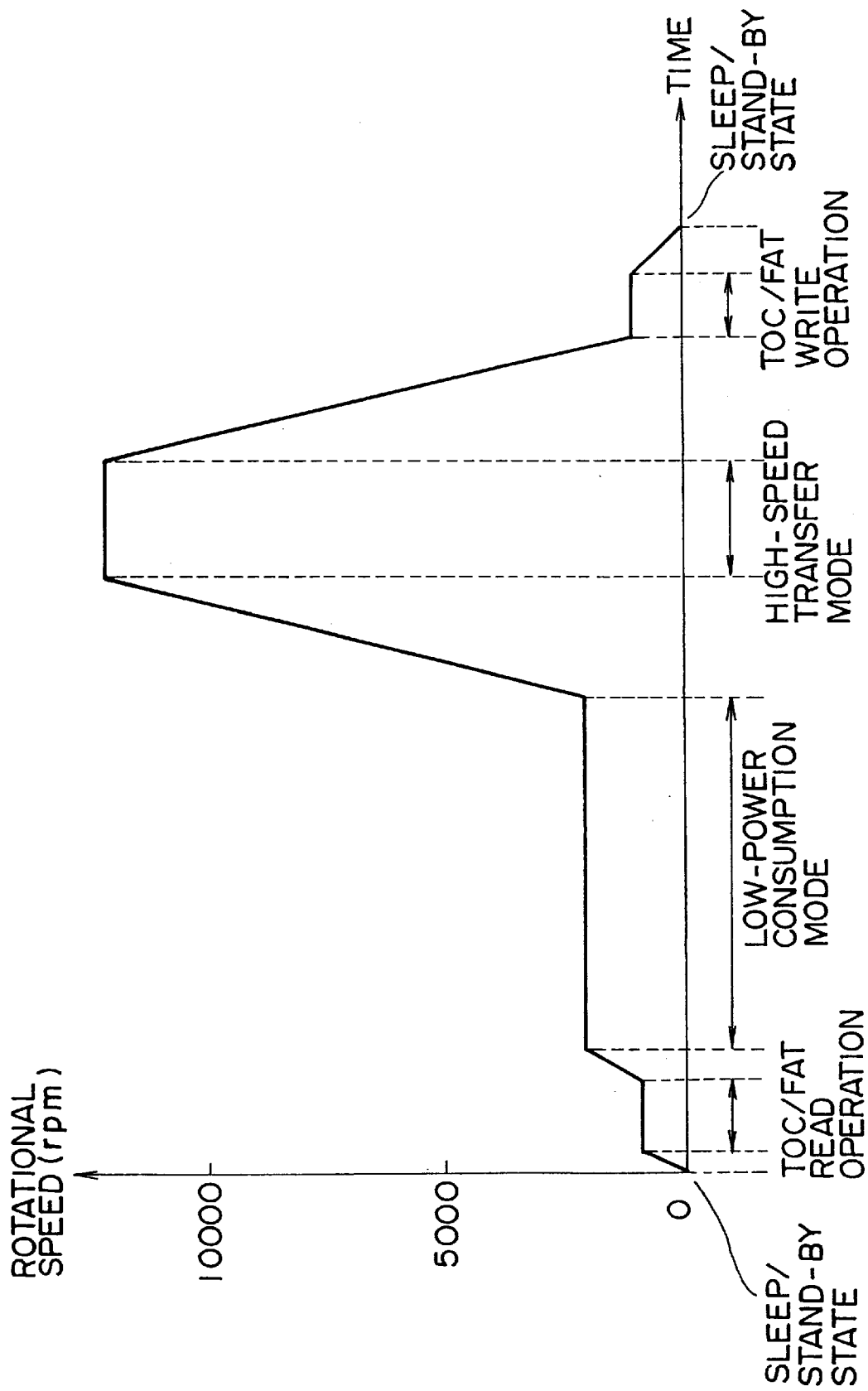
FIG. 3 is a diagram showing a first embodiment implementing transitions among a plurality of drive modes for different kinds of performance displayed in recording and reproduction operations carried out by a recording/reproduction apparatus provided by the present invention.

FIG. 3 is a diagram showing a first embodiment implementing transitions among a plurality of drive modes for different kinds of performance displayed in recording and reproduction operations carried out by a recording/reproduction apparatus.

The transitions of modes shown in FIG. 3 starts with a start-up from a sleep/stand-by state by activation based on a CSS (Contact Start Stop) system to a TOC/FAT read mode. In the TOC/FAT mode, TOC/FAT information is read out early at a lowest rotational speed which allows information to be reproduced from the magnetic disk. The TOC/FAT mode is then followed by a transition to a low-power-consumption mode in which ordinary power-saving recording/reproduction (R/W) operations are carried out at a rotational speed somewhat higher than the lowest rotational speed in the TOC/FAT mode. Then, the rotational speed is further increased in a transition to a high-speed transfer mode in which data can be transferred at a high speed. After the function in the high-speed transfer mode has been executed, the rotational speed is again decreased to the value in the initial TOC/FAT mode in order to carry out positional-information control on data such as an operation to update the contents of the FAT. Subsequently, if no access is made during a predetermined period of time, the magnetic disk is halted so as to restore the sleep/stand-by state.

In the embodiment implementing transitions among a plurality of drive modes shown in the figure, a plurality of R/W operation-modes are exemplified for different kinds of performance displayed starting from an access to a halted state.

Figure 4:
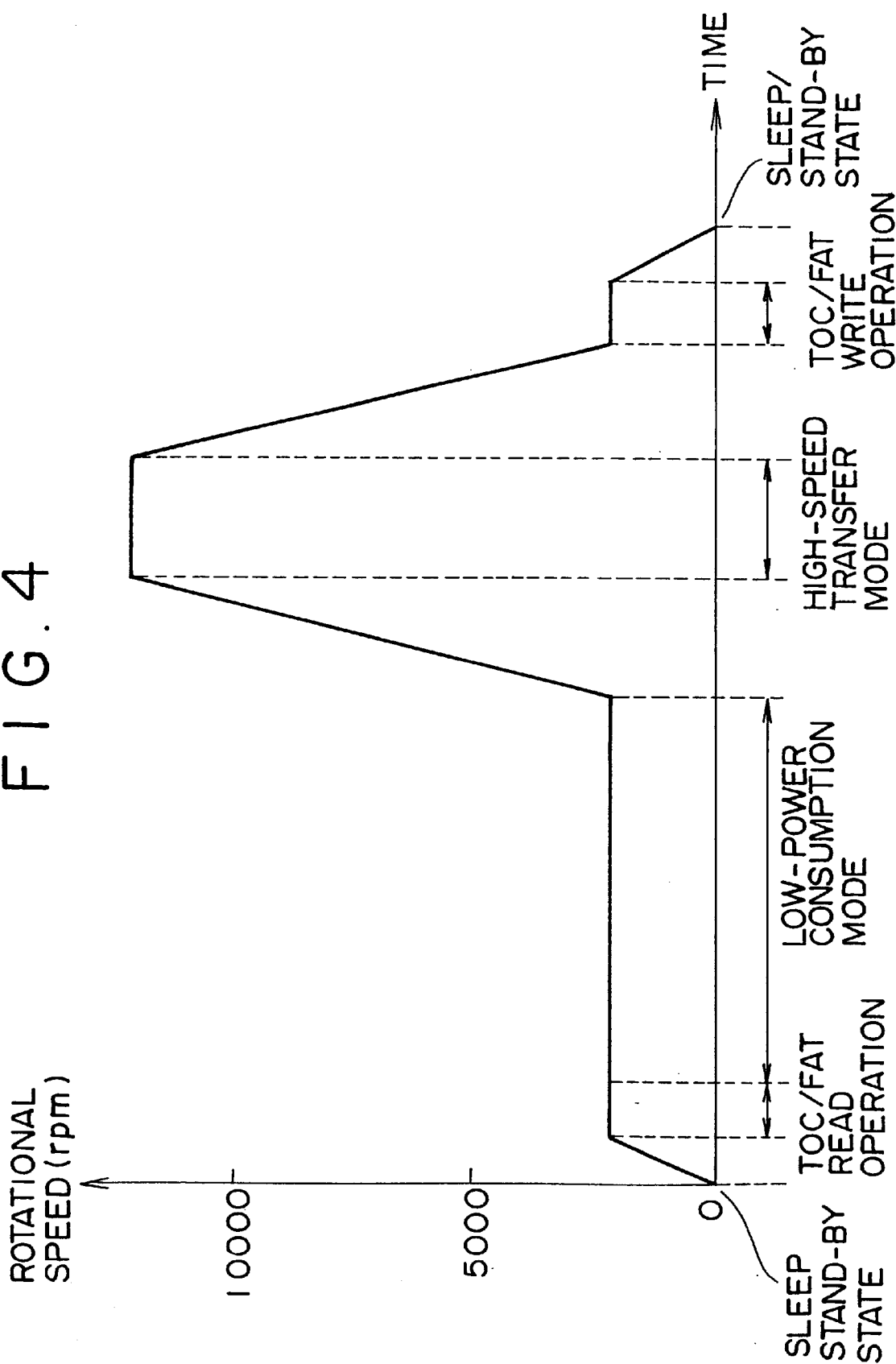
FIG. 4 is a diagram showing a second embodiment implementing transitions among a plurality of drive modes for different kinds of performance displayed in recording and reproduction operations carried out by a recording/reproduction apparatus provided by the present invention.

FIG. 4 is a diagram showing a second embodiment implementing transitions among a plurality of drive modes for different kinds of performance displayed in recording and reproduction operations carried out by a recording/reproduction apparatus.

The drive modes of the second embodiment shown in FIG. 4 are basically the same as the drive modes shown in FIG. 3. However, the second embodiment is different from the first one in that, in the case of the former, however, the rotational speed in the TOC/FAT mode is equal to that in the low-power-consumption mode in which power is saved.

Figure 5:
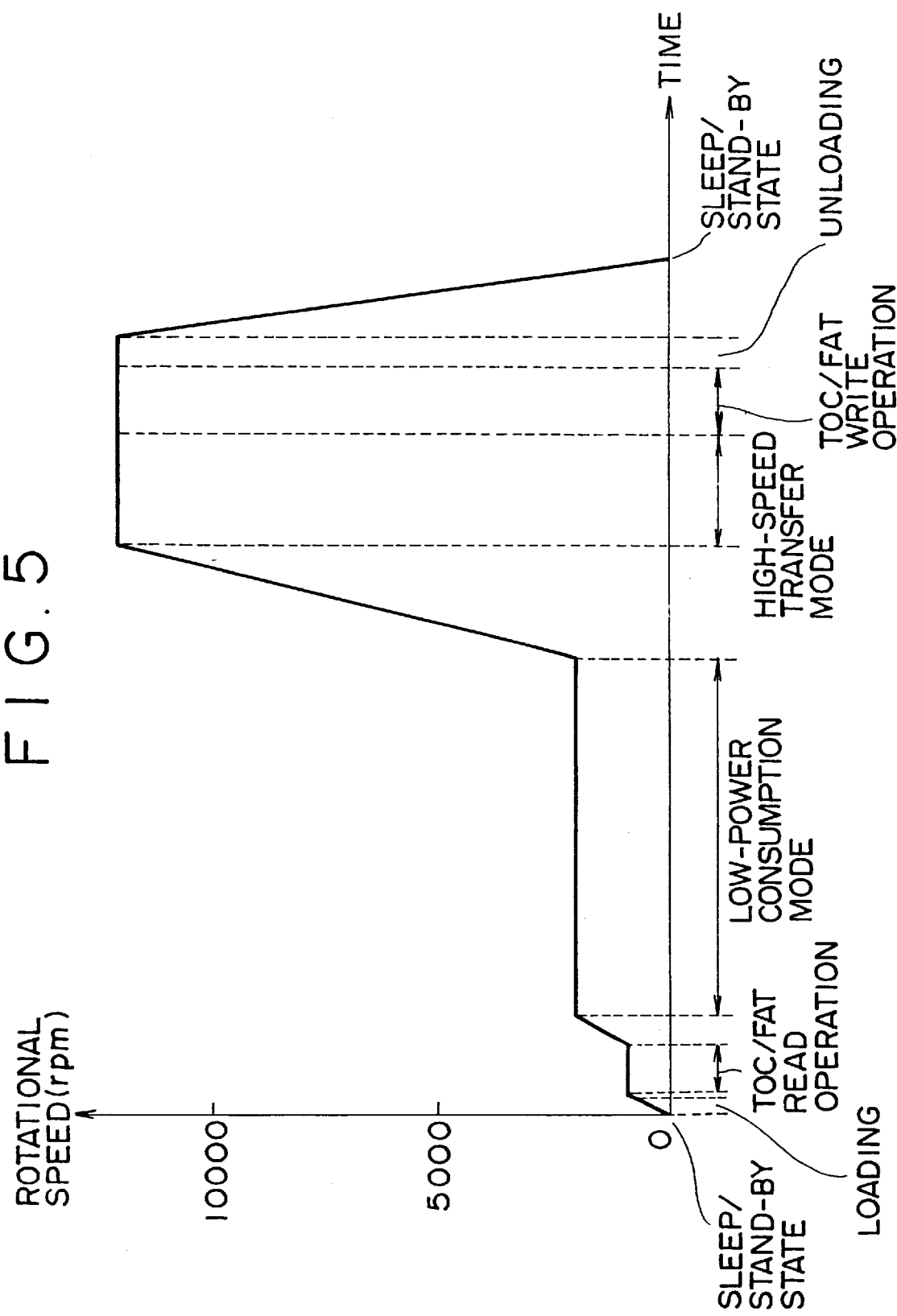
FIG. 5 is a diagram showing a third embodiment implementing transitions among a plurality of drive modes for different kinds of performance displayed in recording and reproduction operations carried out by a recording/reproduction apparatus provided by the present invention.

FIG. 5 is a diagram showing a third embodiment implementing transitions among a plurality of drive modes for different kinds of performance displayed in recording and reproduction operations carried out by a recording/reproduction apparatus. In the third embodiment, a dynamic load/unload start/halt system for loading and unloading a head in a non-contact way is adopted. In this system, the rotational speed at a start time is set at a value different from that at a halt time. The rotational speeds at which the contents of the TOC/FAT are read out and data is written into the TOC/FAT are set at the same values as the rotational speeds at loading and unloading times respectively. That is, in a TOC/FAT read mode, the rotational speed is set at the same value as the rotational speed at a loading time, i.e., the lowest rotational speed. In a TOC/FAT write mode, on the other hand, the rotational speed is set at the same value as the high rotational speed of the high-speed transfer mode.

Figure 6:
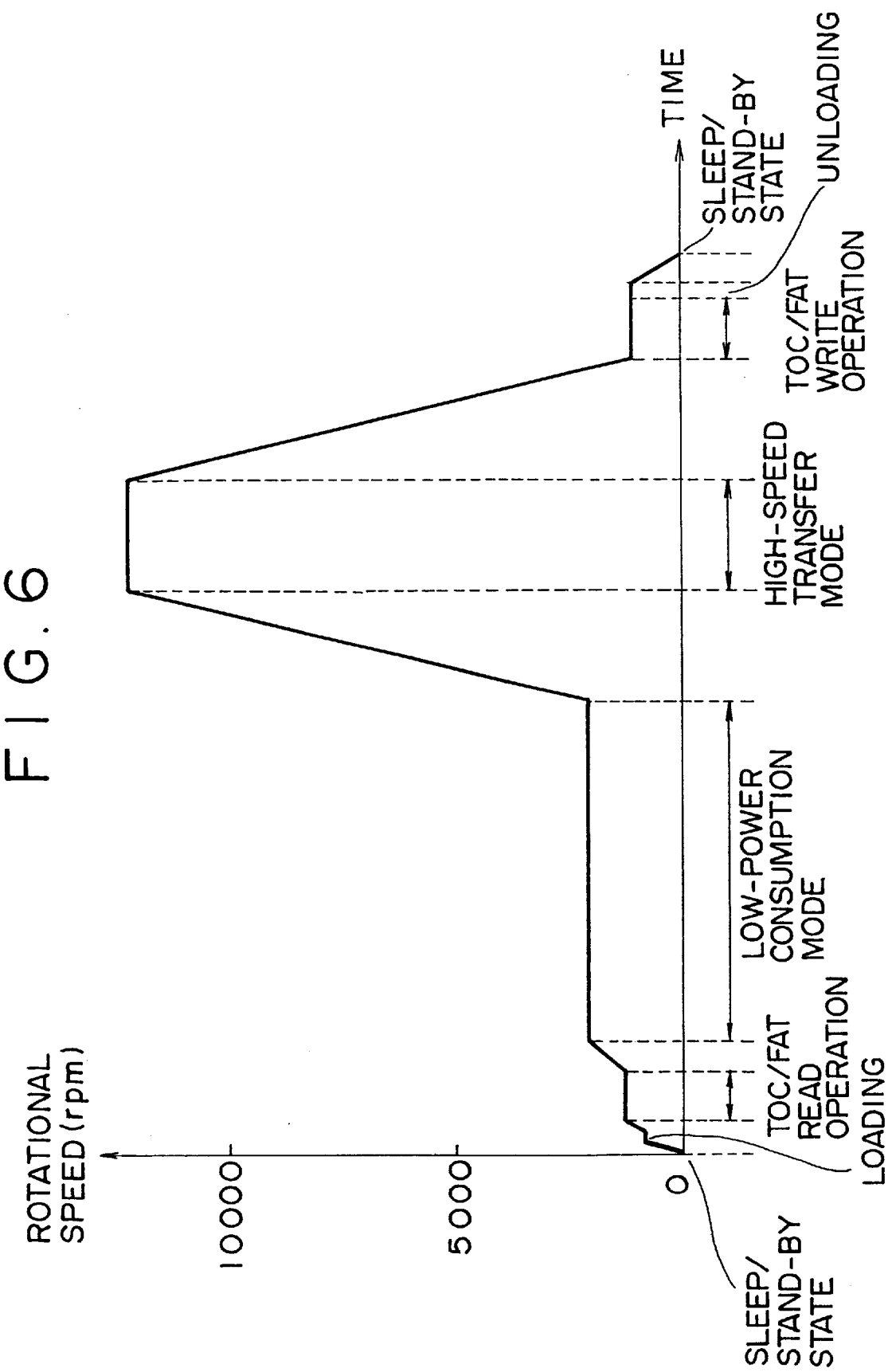
FIG. 6 is a diagram showing a fourth embodiment implementing transitions among a plurality of drive modes for different kinds of performance displayed in recording and reproduction operations carried out by a recording/reproduction apparatus provided by the present invention.

FIG. 6 is a diagram showing a fourth embodiment implementing transitions among a plurality of drive modes for different kinds of performance displayed in recording and reproduction operations carried out by a recording/reproduction apparatus. Much like the third embodiment, in the fourth embodiment, a dynamic load/unload start/halt system for loading and unloading a head in a non-contact way is adopted. In this system, the rotational speed at a start time, that is, a loading time, is set at a value lower than the rotational speed of the TOC/FAT read mode. On the other hand, the rotational speed at an unloading time is set at the same value as that of the TOC/FAT write mode.

It should be noted that the drive modes provided by the present invention are not limited to the first to fourth embodiments described above. That is, the rotational speed of the spindle motor can be switched from a value to another at even more stages so as to implement a desired function at a predetermined rotational speed and to optimize the performance.

Next, an example of a theoretical flow of the method to switch the R/W operating mode is explained by referring to FIG. 7.

The theoretical flow shown in the figure is a procedure which comprises the steps of forming a judgment as to which R/W operating mode the recording/reproduction apparatus of the magnetic disk is to be operated, carrying out processing to set an operating mode based on the outcome of the judgment and executing the operating mode.

As shown in the figure, the theoretical flow starts with a step S1 to determine whether or not an instruction has been received from a CPU on the host side. If an instruction has not been received, the flow goes on to a step S2 to determine whether power is supplied by a battery or a commercial power supply provided by an electric-power company. If the determination at the step S2 indicates that power is supplied by a commercial power supply provided by an electric-power company, the flow proceeds to a step S3 at which the voltage of the power supply is measured. The flow then continues to a step S4 at which an operating mode is determined in accordance with the magnitude of the voltage measured at the step S3. If a sufficiently high voltage has been measured, a high-speed transfer mode is determined to be a desirable mode. Then, the flow goes on to a step S5 to set the operating mode determined at the step S4.

If the determination at the step S2 indicates that power is supplied by a battery, on the other hand, the flow branches to a step S7 to determine whether or not the amount of residual electric charge left in the battery is equal to or smaller than a predetermined quantity. If the amount of residual charge left in the battery is equal to or smaller than the predetermined quantity, the flow goes on to a step S8 at which a low-power-consumption mode is set. Subsequently, the flow continues to a step S11 at which an indicator is set to indicate the status of the operating mode. Typically, a display means using an LED or an LCD display unit for displaying status is used as the indicator.

If the determination at the step S7 indicates that the amount of residual charge in the battery is greater than the predetermined quantity, on the other hand, the flow branches to a step S9 to determine whether or not an interrupt caused by a mechanical switch has been generated. The mechanical switch is operated by the user for setting an operating mode. When the user operates the mechanical switch, an interrupt is generated. If the determination at the step S9 indicates that an interrupt has been generated, the flow proceeds to a step S10 at which an operating mode is set in accordance with the setting position of the mechanical switch. Then, the flow continues to the step S11 at which the indicator is set to indicate the status of the operating mode. If the determination at the step S9 indicates that no interrupt has been generated, on the other hand, the flow proceeds to a step S11, skipping the step S10.

If the determination at the step S1 indicates that an instruction has been received from the host CPU, on the other hand, the theoretical flow branches to a step S6 at which an operating mode is set in accordance with the instruction of the CPU. The theoretical flow then goes on to the step S9 to carry out the pieces of processing of the steps S9 to S11.

As shown in the theoretical flow, an operating mode is set in either of two ways, that is, automatically or manually by the user through an operation of a mechanical switch. In addition, since a CPU has a function to identify the type of power supplied for driving the recording/reproduction apparatus, in the case of a commercial power supply provided by an electric-power company used as the driving power supply, the voltage generated thereby can be identified and the recording/reproduction apparatus can thus be set in a mode appropriate for a commercial power supply provided by an electric-power company. In the case of a battery used as the driving power supply, on the other hand, the recording/reproduction apparatus can be set in a low-power-consumption mode.

It should be noted that, in the embodiment shown in the theoretical flow, an operating mode set by the user through an operation of the mechanical switch takes precedence over an operating mode set automatically except for a case in which the amount of residual electric charge left in the battery is equal to or smaller than a predetermined quantity.

FIG. 8 is a diagram showing a table comparing performances which are displayed in two R/W operating modes when the recording/reproduction apparatus provided by the present invention as described above is applied to a hard-disk drive, a representative magnetic recording/reproduction apparatus. In the comparison shown in FIG. 8, a 2.5' magnetic disk with a surface density of 4 GB/Sq. in (or a line recording density of 235 Kbpi) is assumed. Data in the table has been obtained from simulation of maximum sustained-transfer speeds at three stages of the rotational speed of the magnetic disk. To put it concretely, the rotational speed has been switched among 900 rpm in a TOC/FAT read mode, 1,800 rpm in a low-power-consumption mode and 12,000 rpm in a high-speed transfer mode. The maximum sustained-transfer speed, that is, the sustained-transfer speed along the outermost circumference of the magnetic disk, is a product of a time duty factor of a data actual transfer and an effective transfer speed which is a product of an actual data ratio and a bit rate, where the bit rate is a so-called transfer speed of raw data between the magnetic disk and the head.

In the table, the MPEG2 image-data compression technology is adopted. The table compares recording times of dynamic images and the sustained-transfer times of data recorded in a magnetic disk among the operating modes. In the comparison, the time it takes to make a track jump is normally 3 msec, where a track jump is defined to be one track seek from a current track on which the head is presently positioned to a track adjacent to the current track. As is obvious from results of the simulation, the average ratio of the sustained-transfer speed in the high-speed transfer mode to the sustained-transfer speed in the low-power-consumption mode is about 4.5. In addition, it is also obvious that the ratio of the sustained-transfer speed on the outermost circumference of the magnetic disk (that is, the maximum sustained-transfer speed) to the MPEG2 data transfer speed which is 4 Mbps is equal to or greater than 50, allowing data to be transferred at an extremely high speed. It is the combination of the rotational speed and the performance that enables the recording/reproduction apparatus provided by the present invention to substantially raise the potential such as the capability of transferring data to an extremely high level which is not seen in the conventional disk-type magnetic recording/reproduction apparatus. In addition, the present invention is also applicable to a disk-type magnetic recording/reproduction apparatus which can be applied to a wide range of applications requiring a battery as a power supply.

As described above, in the recording/reproduction apparatus provided by the present invention, the magnetic disk 2 is rotated at one of a plurality of possible rotational speeds. It is thus necessary to use a variable-speed direct-current pulse motor 1-1 as a spindle motor. Next, an example of the configuration of a variable-speed direct-current pulse motor is explained.

Figure 9:
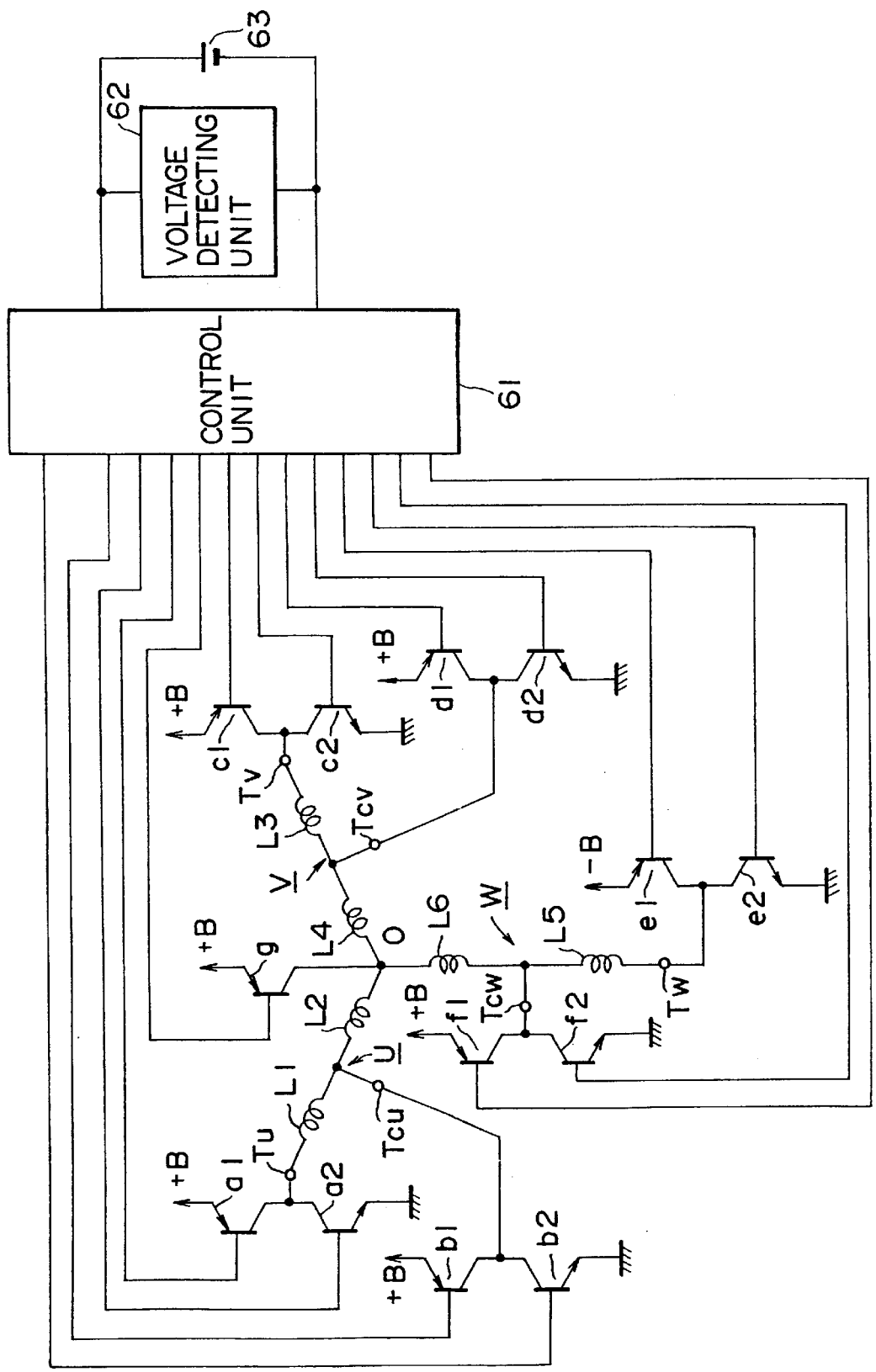
FIG. 9 is a diagram showing an example of a driving circuit for driving phase field windings of a direct-current pulse motor employed in the recording/reproduction apparatus provided by the present invention.

FIG. 9 is a diagram showing an example of a driving circuit for driving phase field windings of a direct-current pulse motor. As shown in the figure, a U-phase field coil comprises coils L1 and L2 connected to each other in series whereas a V-phase field coil comprises coils L3 and L4 connected to each other in series. By the same token, a W-phase field coil comprises coils L5 and L6 connected to each other in series. The number of turns of the coils L1, L3 and L5 is in while the number of turns of the coils L2, L4 and L6 is 2n. That is, the ratio of the number of turns of the coils L1, L3 and L5 to the number of turns of the coils L2, L4 and L6 is 1:2.

The field coils of the U, V and W phases are connected to each other to form a star-like connection. To put it in detail, the ends on one side field coils of the U, V and W phases are connected to each other at a neutral junction point O. The ends Tu, Tv and Tw on the other side of the field coils of the U, V and W phases are each connected to a switch. The switches are actuated to connect the ends Tu, Tv and Tw to either a +B power supply or the ground. The junction point Tcu between the coils L1 and L2 of the U-phase field coil, the junction point Tcv between the coils L3 and L4 of the V-phase field coil and the junction point Tcw between the coils L5 and L6 of the W-phase field coil are each connected to another switch. These other switches are actuated to connect the junction points Tcu, Tcv and Tcw to either a +B power supply or the ground. The switches described above each compose a PNP transistor and an NPN transistor which are connected to each other in series. The emitter of the PNP transistor is connected to the +B power supply while the emitter of the NPN transistor is connected to the ground.

The switches are each controlled by a control unit 61. In the embodiment shown in the figure, the control unit 61 is connected to a battery 63 serving as a power supply thereof. It should be noted, however, that the power supply does not necessarily to be a battery. The control unit 61 can also be driven by rectified power originally supplied by the commercial power supply provided by an electric-power company. In addition, there is also provided a voltage detecting unit 62 for detecting the voltage of the power supply. The control unit 61 is controlled in accordance with the detected voltage.

The following is description of a method for controlling the magnetic disk to rotation in a variable state in the configuration explained above.

Figure 10:
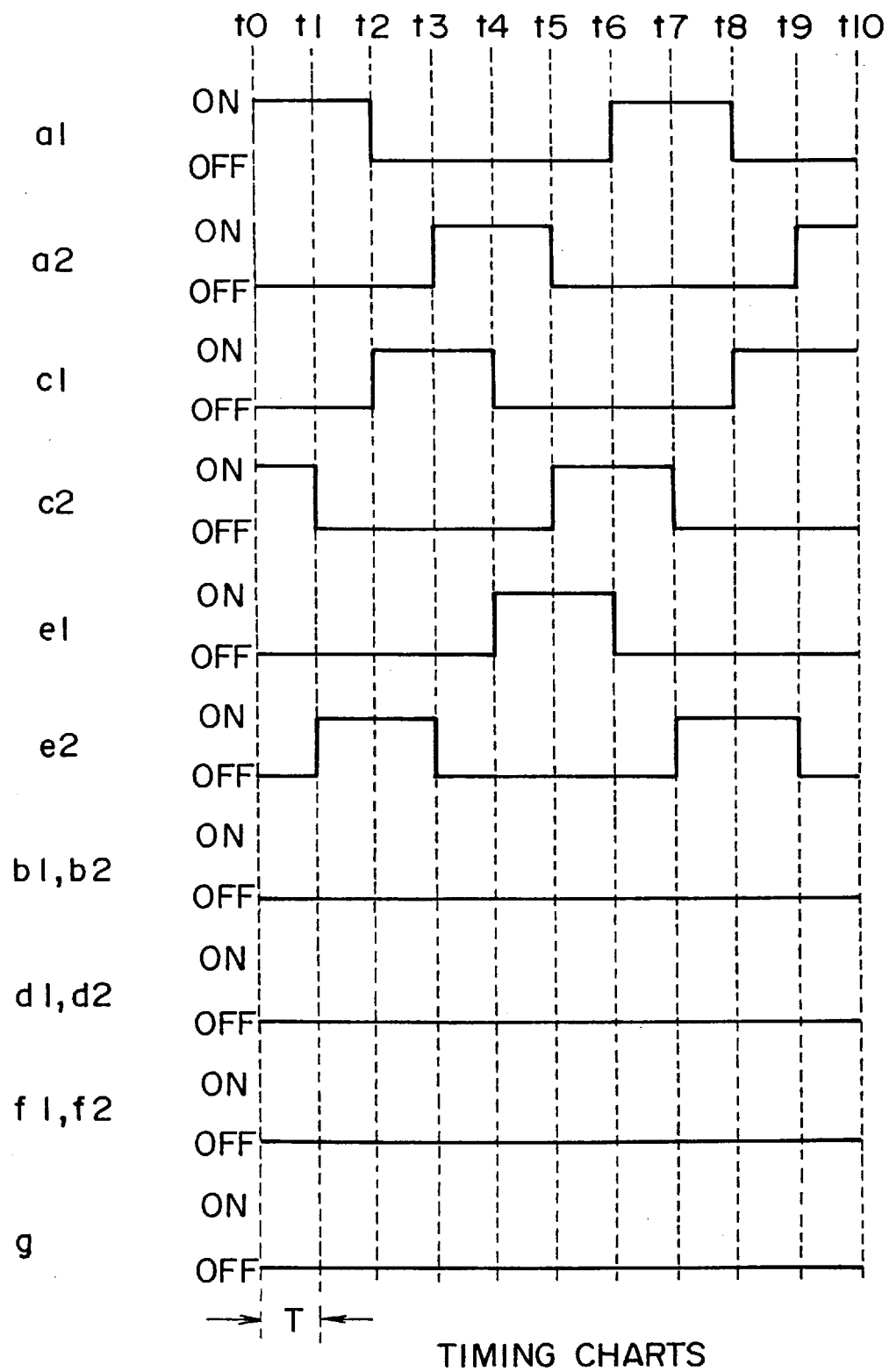
FIG. 10 shows timing charts of signals observed in a variety of portions in the driving circuit shown in FIG. 9.

FIG. 10 shows timing charts of signals observed in a variety of portions in the configuration in a low-speed rotation mode. As indicated by the timing charts, a switch g for driving the neutral junction point O of the star connection, transistors b1 and b2 forming the switch for driving the terminal Tcu of the U phase, transistors c1 and c2 forming the switch for driving the terminal Tcv of the V phase and transistors f1 and f2 forming the switch for driving the terminal Tcw of the W phase are normally in an off state.

Let T be the period of timing with which the switches are driven. At a point of time t0, the transistor a1 is turned on. At that time, since the transistor c2 is in an on state, the terminal Tu is connected to the +B power supply while the terminal Tv is connected to the ground. As a result, a driving current flows through the coils L1 and L2 of the U phase and the coils L3 and L4 of the V phase from the +B power supply.

Then, at a point of time t1 after the period T has lapsed since the point of time t0, the on state of the transistor a1 is sustained but the transistor c2 is turned off. At the same time, however, the transistor e2 is turned on. In this state, the terminal Tu is connected to the +B power supply while the terminal Tw is connected to the ground. As a result, a driving current flows through the coils L1 and L2 of the U phase and the coils L5 and L6 of the W phase from the +B power supply.

Subsequently, at a point of time t2 after the period T has lapsed since the point of time t1, the transistor a1 is turned off but the on state of the transistor e2 is sustained. At the same time, however, the transistor c1 is turned on. In this state, the terminal Tv is connected to the +B power supply while the terminal Tw is connected to the ground. As a result, a driving current flows through the coils L3 and L4 of the V phase and the coils L5 and L6 of the W phase from the +B power supply.

Then, at a point of time t3 after the period T has lapsed since the point of time t2, the on state of the transistor c1 is sustained but the transistor e2 is turned off. At the same time, however, the transistor a2 is turned on. In this state, the terminal Tv is connected to the +B power supply while the terminal Tu is connected to the ground. As a result, a driving current flows through the coils L3 and L4 of the V phase and the coils L1 and L2 of the U phase from the +B power supply.

Subsequently, at a point of time t4 after the period T has lapsed since the point of time t3, the transistor c1 is turned off but the on state of the transistor a2 is sustained. At the same time, however, the transistor e1 is turned on. In this state, the terminal Tw is connected to the +B power supply while the terminal Tu is connected to the ground. As a result, a driving current flows through the coils L5 and L6 of the W phase and the coils L1 and L2 of the U phase from the +B power supply.

Then, at a point of time t5 after the period T has lapsed since the point of time t4, the on state of the transistor e1 is sustained but the transistor a2 is turned off. At the same time, however, the transistor c2 is turned on. In this state, the terminal Tw is connected to the +B power supply while the terminal Tv is connected to the ground. As a result, a driving current flows through the coils L5 and L6 of the W phase and the coils L3 and L4 of the V phase from the +B power supply.

Subsequently, at a point of time t6 after the period T has lapsed since the point of time t5, one control cycle is terminated. At the point time t6, switch control is carried out in the same way as that carried out at the point of time t0. Thereafter, the switch control carried out at the points of time t0 to t5 is performed repeatedly.

Figure 12:
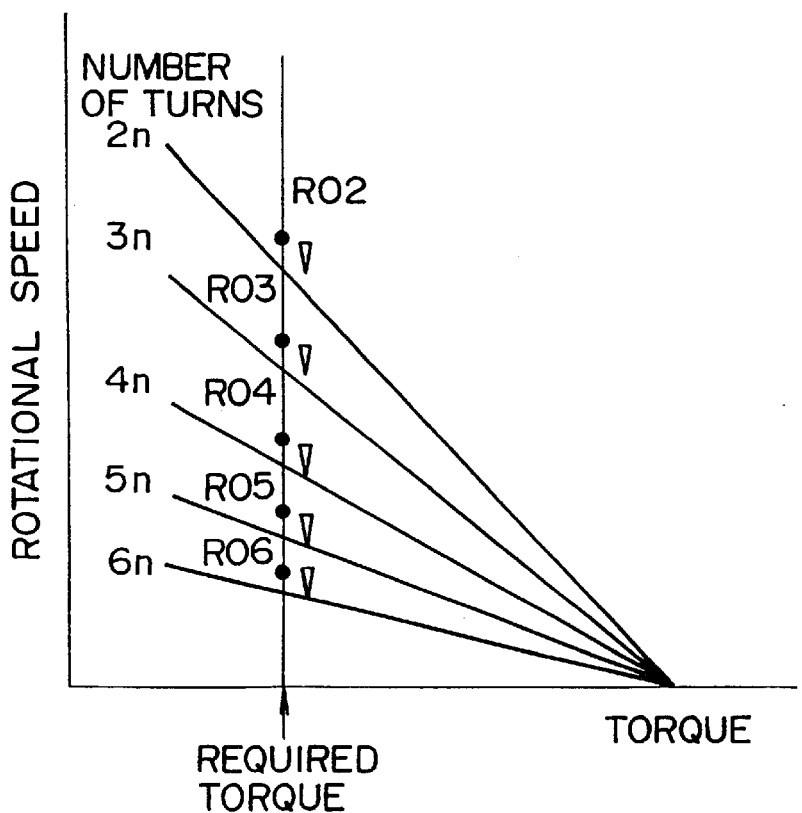
FIG. 12 shows straight-line characteristics each representing a relation between the rotational speed and the torque generated with the total number of turns taken as a parameter of the driving circuit shown in FIG. 9.

As the switch control described above is carried out, a current flows through the field coils of the three U, V and W phases subsequently one phase after another. As a result, the rotor of the direct-current pulse motor is driven thereby to rotation. At that time, for each driving timing, a current is supplied to two coils each having a turn count of 1n and two coils each having a turn count of 2n simultaneously. Thus, the total number of driven turns is 6n. Straight-line characteristics each representing a relation between the rotational speed and the torque generated at that time with the total number of turns taken as a parameter are shown in FIG. 12. As shown in the figure, for a turn count of 6n, the rotational speed for producing a predetermined torque is low in comparison with other turn counts.

Next, a method to drive the magnetic disk in a semi-low-speed rotation mode is explained. The method adopted in the semi-low-speed rotation mode is different from that in the low-speed rotation mode described above in that, in the case of the former, it is the junction points Tcu, Tcv and Tcw between coils for the U, V and W phases respectively that are connected to the ground for each driving timing instead of the terminals Tu, Tv and Tw. Nevertheless, the terminals Tu, Tv and Tw of the U, V and W phases respectively are connected to the +B power supply as is the case with the low-speed rotation mode. In addition, the phases are driven in the same driving timing sequence as the low-speed rotation mode. In this way, for each driving timing, a current is supplied to one coil having a turn count of 1n and two coils each having a turn count of 2n simultaneously. Thus, the total number of driven turns is 5n. The straight-line characteristic representing a relation between the rotational speed and the torque generated at that time for a total turn count of 5n is shown in FIG. 12. As shown in the figure, for a turn count of 5n, the rotational speed for producing a predetermined torque is rather low in comparison with other turn counts.

Next, a method to drive the magnetic disk in an intermediate-speed rotation mode is explained. The method adopted in the intermediate-speed rotation mode is different from that in the semi-low-speed rotation mode described above in that, in the case of the former, it is the junction points Tcu, Tcv and Tcw between coils for the U, V and W phases respectively that are connected to the +B power supply for each driving timing instead of the terminals Tu, Tv and Tw. Nevertheless, the terminals Tcu, Tcv and Tcw of the U, V and W phases respectively are connected to the ground as is the case with the semi-low-speed rotation mode. In addition, the phases are driven in the same driving timing sequence as the low-speed rotation mode. In this way, for each driving timing, a current is supplied to two coils each having a turn count of 2n simultaneously. Thus, the total number of driven turns is 4n. The straight-line characteristic representing a relation between the rotational speed and the torque generated at that time for a total turn count of 4n is shown in FIG. 12. As shown in the figure, for a turn count of 4n, the rotational speed for producing a predetermined torque is an intermediate speed in comparison with other turn counts.

Next, a method to drive the magnetic disk in a semi-high-speed rotation mode is explained. The method adopted in the semi-high-speed rotation mode is different from that in the low-speed rotation mode described above in that, in the case of the former, it is the neutral junction point O for the U, V and W phases respectively that are connected to the +B power supply for each driving timing instead of the terminals Tu, Tv and Tw. Nevertheless, the terminals Tu, Tv and Tw of the U, V and W phases respectively are connected to the ground as is the case with the low-speed rotation mode. In addition, the phases are driven in the same driving timing sequence as the low-speed rotation mode. In this way, for each driving timing, a current is supplied to a coil having a turn count of 1n and a coil having a turn count of 2n simultaneously. Thus, the total number of driven turns is 3n. The straight-line characteristic representing a relation between the rotational speed and the torque generated at that time for a total turn count of 3n is shown in FIG. 12. As shown in the figure, for a turn count of 3n, the rotational speed for producing a predetermined torque is rather high in comparison with other turn counts.

Next, a method to drive the magnetic disk in a high-speed rotation mode is explained. The method adopted in the high-speed rotation mode is different from that in the semi-high-speed rotation mode described above in that, in the case of the former, it is the junction points Tcu, Tcv and Tcw between coils for the U, V and W phases respectively that are connected to the ground for each driving timing instead of the terminals Tu, Tv and Tw. Nevertheless, the neutral junction point O is connected to the +B power supply as is the case with the semi-high-speed rotation mode. In addition, the phases are driven in the same driving timing sequence as the low-speed rotation mode. In this way, for each driving timing, a current is supplied to a coil having a turn count of 2n. Thus, the total number of driven turns is 2n. The straight-line characteristic representing a relation between the rotational speed and the torque generated at that time for a total turn count of 2n is shown in FIG. 12. As shown in the figure, for a turn count of 2n, the rotational speed for producing a predetermined torque is high in comparison with other turn counts.

In the recording/reproduction apparatus provided by the present invention, by adopting the driving method described above, the direct-current pulse motor can be rotated at a variable speed. Straight-line characteristics each representing a relation between the rotational speed and the torque with the total number of turns taken as a parameter are shown in FIG. 12 for different operating modes, from the low-speed rotation mode to the high-speed rotation mode. As a motor characteristic, the gradient of a line representing the current supplied to the motor and the torque generated by the motor is not changed much by variations in power-supply voltage, that is, almost fixed independently of variations in power-supply voltage. Thus, the number of turns is changed to switch the torque characteristic from one line to another to give a different rotational speed for generating a predetermined torque. Assume that a required torque shown in FIG. 12 needs to be generated and a predetermined speed is obtained by attenuation control of rotational speeds RO2, RO3, RO4, RO5 and RO6 shown in the figure. In this case, a selected one of the drive modes like those shown in FIG. 3 to 6 will determine which speed of RO2, RO3, RO4, RO5 and RO6 the direct-current pulse motor will be rotated.

Figure 11:
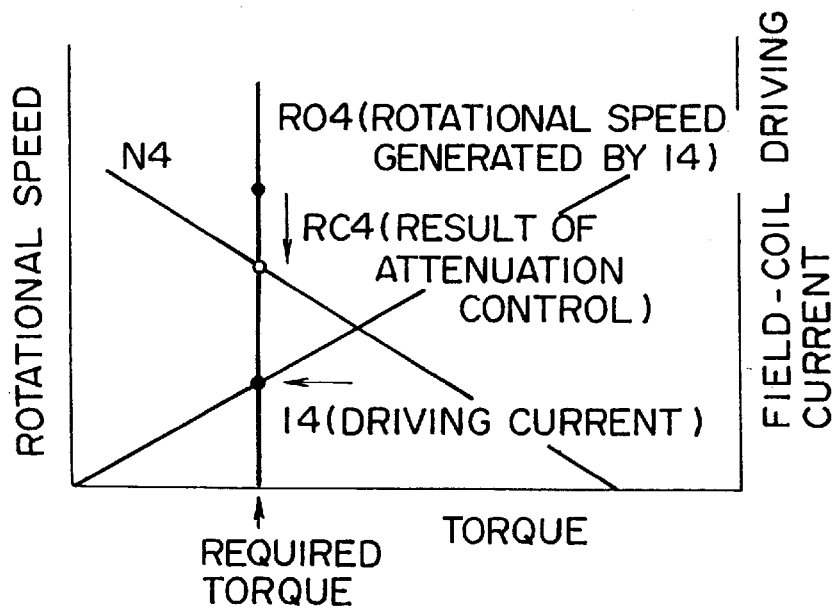
FIG. 11 is a diagram showing relations among the rotational speed, the torque and the driving current.

FIG. 11 is a diagram showing relations among the rotational speed, the torque and the driving current as well as a point representing the rotational speed RO4, a selected rotational speed. Assume that the direct-current pulse motor 1-1 is set initially at a high rotational speed before controlling the speed through attenuation control. The vertical axes at the left and right ends of FIG. 11 represent the rotational speed and the current flowing through a winding respectively. On the other hand, the horizontal axis represents the winding torque. As shown in the figure, the relation between the driving current and the winding torque is represented by a right ascending straight line. The driving current for generating the required torque is I4 which rotates the direct-current pulse motor 1-1 at the rotational speed RO4. The rotational speed RO4 is then reduced to a rotational speed RC4 by attenuation control. In this case, since the difference (RO4–RC4) which represents a control quantity is small, the amount of loss incurred in the attenuation control can also be reduced.

It should be noted that, in an operation to record or reproduce data according to the present invention, it is always necessary to read out header information included in address information from a predetermined track. As shown in FIG. 2, by adding a data jitter phase from the reproduction-signal processing means and (a result) of hold processing based on a data burst miss to the rotation detection correcting means by using an addition processing means, a plurality of accurate disk rotations can be implemented. In addition, by adopting the rotation driving method, it is possible to carry out recording and reproduction operations in a plurality of power saving rotation modes with a small amount of power loss over a rotational-speed range having a width twice that of the conventional one.

It should be noted that, in the recording/reproduction apparatus described above, the FAT write track for storing position control information of data can be located approximately at the center position of the magnetic disk. In such an arrangement, in a recording operation, data is written from a FAT area approximately at the center position of the magnetic disk in a direction toward the outermost circumference or from a FAT area approximately at the center position of the magnetic disk in a direction toward the innermost circumference.

In addition, in a high-speed transfer mode, power specially for the mode can be supplied from an external power supply. In this case, a high-speed transfer mode can be set automatically as soon as power is supplied from an external power supply specially provided for the high-speed transfer mode.

Furthermore, when a battery is also used for supplying power, the battery can be electrically charged by an external source while the recording/reproduction apparatus is operating in a high-speed transfer mode.

In addition, when a battery is also used for supplying power, the high-speed transfer mode can be disabled when the amount residual electric charge left in the battery becomes smaller than a predetermined value.

Furthermore, in a low-power consumption mode, more reduction of power consumption can be implemented by limiting the access speed of the head.

Having a configuration described above, the present invention allows a recording/reproduction apparatus with a plurality of recording/playback modes for different kinds of performance to be implemented. In addition, since the characteristic representing a relation between the torque generated by the spindle motor for rotating the disk and the rotational speed can be changed depending upon the required function, operations to upload and download data at a very high speed can be carried out and, at the same time, it is also possible to implement reduction of power consumption in an ordinary recording/reproduction mode typically for lengthening the life of a battery which is used as a power supply. In addition, it is also possible to shorten the rise time from a sleep or stand-by mode to a recording/reproduction mode, that is, to make the response characteristic of the recording/reproduction apparatus to the user even better than that of the conventional disk-type recording/reproduction apparatus.

What is claimed is:

1. A recording/reproducing method for recording and reproducing data into and from a rotating magnetic disk having spiral form data tracks, said method having a plurality of operating modes including at least a low-speed drive mode for recording/reproducing data into and from the magnetic disk when rotating at a low-speed, a table of contents/file allocation table (TOC/FAT) write mode for recording TOC/FAT data to the magnetic disk when rotating at a speed slower than said low-speed drive mode, and a high-speed drive mode for recording/reproducing data into and from the magnetic disk when rotating at a high-speed.

2. The recording/reproducing method according to claim 1, wherein a write track of a FAT for recording position control information of data is located approximately at a center position of the recordable tracks of said magnetic disk.

3. The recording/reproducing method according to claim 2, whereby the data is recorded from a position of said write track of said FAT in a direction outward towards the circumference and inward towards the center of said magnetic disk.

4. The recording/reproducing method according to claim 1, further comprising the step of loading and unloading a recording/reproducing head in a non-contact way at start/halt times, with the rotational speed of said magnetic disk at said start/halt times being less than a low-power consumption mode speed.

5. The recording/reproducing method according to claim 1, further comprising the step of distinguishing between power supplied from a battery and from AC mains to enter a low-power consumption mode when power is supplied from a battery.

6. A recording/reproducing apparatus for recording and reproducing data into and from a rotating magnetic disk having spiral form data tracks, comprising:
   a rotation driving unit for rotating said magnetic disk; and
   a control unit for controlling said rotation driving unit to rotate said magnetic disk in a plurality of operating modes including at least a low-speed drive mode for recording/reproducing data onto and from the magnetic disk when rotating at a low-speed, a table of contents/file allocation table (TOC/FAT) write mode for recording TOC/FAT data to the magnetic disk when rotating at a speed slower than said low-speed drive mode, and a high-speed drive mode for recording/reproducing data onto and from the magnetic disk when rotating at a high-speed.

7. The recording/reproducing apparatus according to claim 6, wherein a head driving/controlling unit is provided for driving and controlling a head to a write track of a FAT located approximately at a center position of the recordable tracks of said magnetic disk.

8. The recording/reproducing apparatus according to claim 7, wherein said head is driven and controlled so that data is recorded from a position of said write track of said FAT in a direction outward towards the circumference and inward towards the center of said magnetic disk.

9. The recording/reproducing apparatus according to claim 7, wherein said head is loaded and unloaded in a non-contact way at start/halt times, with the rotational speed of said magnetic disk at said start/halt times being less than a low-power consumption mode speed.

10. The recording/reproducing apparatus according to claim 6, wherein said apparatus distinguishes between power supplied from a battery and from AC mains to enter a low-power consumption mode when power is supplied from a battery.

11. A recording/reproducing method for recording and reproducing data into and from a rotating magnetic disk, said method having a plurality of operating modes including at least a low-speed drive mode for recording/reproducing data into and from the magnetic disk when rotating at a low-speed, a table of contents/file allocation table (TOC/FAT) write mode and read mode for recording and reproducing TOC/FAT data to the magnetic disk when rotating at a speed slower than said low-speed drive mode, and a high-speed drive mode for recording/reproducing data into and from the magnetic disk when rotating at a high-speed, wherein after said TOC/FAT information is recorded at said speed slower than said low-speed drive mode a head is unloaded from said magnetic disk while in said speed slower than said low-speed drive mode.

12. The recording/reproducing method according to claim 11, wherein said TOC/FAT information is recorded in approximately a center position of the recordable tracks of said magnetic disk.

13. The recording/reproducing method according to claim 12, wherein data is recorded from said center position of said TOC/FAT information in said magnetic disk outward towards the circumference and inward towards the center of the magnetic disk.

14. The recording/reproducing method according to claim 11, further comprising the step of distinguishing between power supplied from a battery and from AC mains to enter a low-power consumption mode when power is supplied from a battery.

15. A recording/reproducing method for recording and reproducing data into and from a rotating magnetic disk, said method having a plurality of operating modes including at least a low-speed drive mode for recording/reproducing data into and from the magnetic disk when rotating at a low-speed, a table of contents/file allocation table (TOC/FAT) write mode for recording TOC/FAT data to the magnetic disk when rotating at a speed slower than said low-speed drive mode, and a high-speed drive mode for recording/reproducing data into and from the magnetic disk when rotating at a high-speed, wherein a head is loaded and unloaded to the magnetic disk when rotating at a speed slower than said low-speed drive mode.

16. The recording/reproducing method according to claim 15, wherein TOC/FAT information is recorded in approximately a center position of the recordable tracks of said magnetic disk.

17. The recording/reproducing method according to claim 16, wherein data is recorded from said center position of said TOC/FAT information in said magnetic disk outward towards the circumference and inward towards the center of the magnetic disk.

18. The recording/reproducing method according to claim 15, wherein when power for performing said method is supplied by a battery, all operating modes operate with low power consumption.

19. A recording/reproducing apparatus for recording and reproducing data into and from a magnetic disk driven to rotation, comprising:
   a rotation driving unit for rotating said magnetic disk; and
   a control unit for controlling said rotation driving unit to rotate said magnetic disk in a plurality of operating modes including at least a low-speed drive mode for recording/reproducing data into and from the magnetic disk when rotating at a low-speed, a table of contents/file allocation table (TOC/FAT) write mode for recording TOC/FAT data to the magnetic disk when rotating at a speed slower than said low-speed drive mode, and a high-speed drive mode for recording/reproducing data into and from the magnetic disk when rotating at a high-speed, wherein after said TOC/FAT information is recorded at said speed slower than said low-speed drive mode a head is unloaded from the magnetic disk while in said speed slower than said low-speed drive mode.

20. The recording/reproducing apparatus according to claim 19, wherein said TOC/FAT information is recorded in approximately a center position of the recordable tracks of said magnetic disk.

21. The recording/reproducing apparatus according to claim 20, wherein data is recorded from said center position of said TOC/FAT information in said magnetic disk outward towards the circumference and inward towards the center of the magnetic disk.

22. The recording/reproducing apparatus according to claim 19, wherein when power is supplied by a battery, all operating modes operate with low power consumption.

23. A recording/reproducing apparatus for recording and reproducing data into and from a magnetic disk driven to rotation, comprising:

a rotation driving unit for rotating said magnetic disk; and a control unit for controlling said rotation driving unit to rotate said magnetic disk in a plurality of operating modes including at least a low-speed drive mode for recording/reproducing data into and from the magnetic disk when rotating at a low-speed, a table of contents/ file allocation table (TOC/FAT) write mode for recording TOC/FAT data to the magnetic disk when rotating at a speed slower than said low-speed drive mode, and a high-speed drive mode for recording/reproducing data into and from the magnetic disk when rotating at a high-speed, wherein a head is loaded and unloaded to the magnetic disk when rotating at a speed slower than said low-speed drive mode.

24. The recording/reproducing apparatus according to claim 23, wherein TOC/FAT information is recorded in approximately a center position of the recordable tracks of said magnetic disk.

25. The recording/reproducing apparatus according to claim 24, wherein data is recorded from said center position of said TOC/FAT information in said magnetic disk outward towards the circumference and inward towards the center of the magnetic disk.

26. The recording/reproducing apparatus according to claim 23, wherein when power is supplied by a battery, all operating modes operate with low power consumption.

* * * * *